(12) United States Patent
Deckers et al.

(10) Patent No.: US 8,051,683 B2
(45) Date of Patent: *Nov. 8, 2011

(54) OPTICAL FIBER PCVD USING SHIFTING OF A DEPOSITION REVERSAL POINT

(75) Inventors: Rob Hubertus Matheus Deckers, Eindhoven (NL); Marco Korsten, Eindhoven (NL); Robert Martinus Marie Cremers, Valkenswaard (NL); Koen de Jongh, Son en Breugel (NL)

(73) Assignee: Draka Comteq, B.V., Amsterdam (NL)

( * ) Notice: Subject to any disclaimer, the term of this patent is extended or adjusted under 35 U.S.C. 154(b) by 625 days.

This patent is subject to a terminal disclaimer.

(21) Appl. No.: 12/109,503

(22) Filed: Apr. 25, 2008

(65) Prior Publication Data

US 2008/0271494 A1  Nov. 6, 2008

(30) Foreign Application Priority Data

Apr. 27, 2007 (NL) ...................................... 1033773

(51) Int. Cl.
C03B 37/018 (2006.01)
(52) U.S. Cl. .......................................... 65/391; 65/417
(58) Field of Classification Search .............. 65/417, 65/418, 391
See application file for complete search history.

(56) References Cited

U.S. PATENT DOCUMENTS

| | | | |
|---|---|---|---|
| 4,714,589 A * | 12/1987 | Auwerda et al. | 427/573 |
| 4,741,747 A | 5/1988 | Geittner et al. | |
| 5,145,509 A | 9/1992 | Bachmann et al. | |
| 5,188,648 A | 2/1993 | Geittner et al. | |
| 5,211,732 A * | 5/1993 | Abbott et al. | 65/421 |
| 5,925,163 A * | 7/1999 | Evans et al. | 65/377 |
| 5,958,102 A * | 9/1999 | Shimada et al. | 65/382 |
| 6,600,769 B2 | 7/2003 | Simons et al. | |
| 7,068,899 B2 | 6/2006 | Milicevic et al. | |
| 2003/0164007 A1 | 9/2003 | Simons et al. | |
| 2004/0163417 A1 | 8/2004 | Simons et al. | |
| 2004/0237593 A1 | 12/2004 | Van Stralen et al. | |
| 2005/0120751 A1 | 6/2005 | Simons et al. | |
| 2007/0003197 A1 | 1/2007 | Matthijsse et al. | |
| 2007/0289532 A1 | 12/2007 | Hartsuiker et al. | |
| 2008/0031582 A1 | 2/2008 | Gonnet et al. | |
| 2008/0044150 A1 | 2/2008 | Terpsma et al. | |
| 2008/0063812 A1 | 3/2008 | Deckers et al. | |
| 2008/0271494 A1 | 11/2008 | Deckers et al. | |

FOREIGN PATENT DOCUMENTS

| | | | |
|---|---|---|---|
| EP | 1988063 A1 | 5/2008 | |
| JP | 57-51139 | * | 3/1982 |
| WO | 2004/101458 A1 | 11/2004 | |

OTHER PUBLICATIONS

English language abstract of Okamura JP 57-51139 (1982).*

(Continued)

*Primary Examiner* — John Hoffman
(74) *Attorney, Agent, or Firm* — Summa, Additon & Ashe, P.A.

(57) ABSTRACT

The present invention relates to a method for manufacturing a preform for optical fibers via a vapor deposition process in which the position of the reversal point near the substrate tube's supply side shifts along the longitudinal axis of the substrate tube during at least part of the deposition process.

25 Claims, 4 Drawing Sheets

OTHER PUBLICATIONS

European Search Report and Written Opinion in counterpart European Application No. 08007338, dated Aug. 27, 2008 [cited Patent No. 4,741,747 disclosed in prior IDS].

U.S. Appl. No. 12/107,217 for "Apparatus and Method for Manufacturing an Optical Preform", filed Apr. 22, 2008.

U.S. Appl. No. 11/939,931 for "Apparatus and Method for Performing a PCVD Process", filed Nov. 14, 2007.

Dutch Search Report and Written Opinion in corresponding Dutch Application No. 1033773, dated Dec. 11, 2007.

European druckexemplar communicating an intention to grant counterpart European Application No. 08007338, the text and drawings; Mar. 9, 2010.

* cited by examiner

OPTICAL FIBER PCVD USING SHIFTING OF A DEPOSITION REVERSAL POINT

CROSS-REFERENCE TO PRIORITY APPLICATION

This application claims the benefit of pending Dutch Application No. 1033773 for "A Method for Manufacturing a Preform as well as an Optical Fibre to be Obtained Therewith" (filed Apr. 27, 2007, at the Dutch Patent Office) via 35 U.S.C. §119. Dutch Application No. 1033773 is hereby incorporated by reference in its entirety.

FIELD OF THE INVENTION

The present invention relates to a method for manufacturing a preform for optical fibers using a vapor deposition process, including the steps of (i) providing a hollow glass substrate tube having a supply side and a discharge side, (ii) supplying doped or undoped glass-forming gases to the interior of the substrate tube via its supply side, (iii) creating plasma conditions within the interior of the substrate tube for depositing glass layers on the inner surface of the substrate tube by moving the plasma back and forth along the longitudinal axis of the substrate tube between a reversal point near the supply side and a reversal point near the discharge side of the substrate tube, and (iv) collapsing into an optical preform the tube resulting from step (iii). The present invention further relates to drawing an optical fiber from the optical preform formed in step (iv).

BACKGROUND OF THE INVENTION

Methods for manufacturing optical fiber preforms are known.

For example, U.S. Pat. No. 4,741,747, which is hereby incorporated by reference in its entirety, discloses a method of fabricating optical fibers, wherein an end of a preform (i.e., end taper) is reduced by moving a plasma in the area of at least one reversal point nonlinearly with time and/or by changing the longitudinal extent of the plasma as a function of time. The term "end taper" means the deposition regions at the ends of the substrate tube, where the optical and geometric properties of the deposited layers are insufficiently constant.

U.S. Pat. No. 5,188,648, which is hereby incorporated by reference in its entirety, discloses a method for reducing the geometric end taper by interrupting the reciprocating movement of the plasma at the reversal point on the supply side of the glass-forming gases during glass deposition.

U.S. Pat. No. 5,145,509, which is hereby incorporated by reference in its entirety, discloses a method for reducing the geometric taper, by placing a glass rod inside the substrate tube, such that the longitudinal axis of the glass rod coincides with that of the glass tube, and the radius of the glass rod is selected to be a maximum of 0.67 times and a minimum of 0.2 times the inner radius of the glass substrate tube. The glass rod is removed from the interior of the substrate tube upon completion of the deposition process, followed by the collapsing of the hollow substrate tube into a solid preform at an elevated temperature.

International Patent Application No. WO 2004/101458 and its counterpart U.S. Pat. No. 7,068,899, which is hereby incorporated by reference in its entirety, discloses a method for reducing the taper in a preform, by varying the velocity of the plasma in a first "end region" near a reversal point, both as a function of time during the deposition process, and as a function of the position in the first end region. The term "end region" is defined as the region in which the velocity of the plasma is varied as a function of the position.

One of the problems of the methods according to the above-cited documents is the fact that an optimization of the geometric taper will lead to optical taper and vice versa. A Plasma Chemical Vapor Deposition (PCVD) process, for example, carries an inherent tradeoff between geometric taper and optical taper.

Accordingly, there is a need for an improved method for making optical preforms by way of a vapor deposition process.

SUMMARY OF THE INVENTION

The present invention embraces a method for manufacturing an optical preform for optical fibers via a vapor deposition process, that includes (i) providing a hollow glass substrate tube having a supply side and a discharge side; (ii) supplying doped or undoped glass-forming gases to the interior of the substrate tube via the substrate tube's supply side; (iii) creating plasma conditions in the substrate tube's interior to deposit glass layers on the substrate tube's inner surface by moving the plasma back and forth along the substrate tube's longitudinal axis between a reversal point near the substrate tube's supply side and a reversal point near the substrate tube's discharge side; and (iv) consolidating into an optical preform the tube obtained in step (iii). In particular, the present invention, during at least part of step (iii), shifts the position of the reversal point near the substrate tube's supply side along the substrate tube's longitudinal axis.

The present inventors have found that, during a chemical vapor deposition process in which plasma is reciprocated between two reversal points having a fixed position relative to a substrate tube, the longitudinal refractive index profile usually exhibits a maximum value near the substrate tube's supply side. The term "chemical vapor deposition process" refers to, for example, the Plasma Chemical Vapor Deposition (PCVD) process. The term "longitudinal refractive index profile" refers to the value of the refractive index as a function of the longitudinal position along the optical preform.

In particular, a maximum value for the refractive index near the substrate tube's supply side has been found to occur when the length of the substrate tube (along which the plasma is moved nonlinearly as a function of time) is optimized to obtain a maximum usable preform length.

Accordingly, in one aspect, the present invention embraces a method for manufacturing a preform for optical fibers using a vapor deposition process in which both the optical taper and the geometric taper are minimized.

In another aspect, the present invention embraces a method for manufacturing a preform for optical fibers using a vapor deposition process in which a maximum preform length can be used to form the optical fiber.

In yet another aspect, the present invention embraces a method for manufacturing a preform for optical fibers using a vapor deposition process in which the stress that develops in the deposited glass layers during the deposition process is reduced.

According to the present invention, the position of the reversal point near the supply side of the substrate tube shifts along the longitudinal axis of the substrate tube during at least part of the aforementioned step (iii), namely the deposition of glass layers as the plasma reciprocates along the substrate tube's longitudinal axis between a reversal point near the substrate tube's supply side and a reversal point near the substrate tube's discharge side.

One or more of the foregoing objects are accomplished by using the method according to the present invention.

The present inventors have surprisingly found that the aforementioned maximum value for the refractive index near the substrate tube's supply side can be reduced by shifting the position of the reversal point near the substrate tube's supply side along the longitudinal axis of the substrate tube during at least part of step (iii). Within this context, the inventors have further found that the effect on the geometric taper is negligible and that it has thus become possible to increase the usable preform length.

Although the taper effect is less pronounced on the substrate tube's discharge side than on the substrate tube's supply side, it is also possible to shift the position of the reversal point near the discharge side during at least part of step (iii). The stress that is built into the deposited glass layers during the vapor deposition process is thereby reduced.

In one embodiment, the position of the reversal point near the substrate tube's supply side shifts away from the discharge side. Such a shift makes it possible to increase the usable preform length.

In another embodiment, the position of the reversal point near the substrate tube's supply side may also shift in the direction of the discharge side.

In both embodiments, the amount of stress that is created in the deposited glass is reduced. As will be appreciated by those having ordinary skill in the art, a reduced amount of stress in the glass helps to prevent layer cracking. Layer cracking occurs when the built-in stress of the deposited layers is so high that the glass layers, which have been deposited one after the other, become detached from each other. A preform that exhibits layer cracking can be partly used, if at all, for forming optical fibers.

Typically, the shift of the position of the reversal point near the supply side amounts to maximally half the length of the plasma. The term "length of the plasma" is to be understood to refer to the length parallel to the substrate tube's longitudinal axis.

By way of example, a typical plasma might measure about 200 millimeters in length (e.g., between about 100 millimeters and 300 millimeters or so). The present inventors have found that when the shift of the reversal point near the substrate tube's supply side exceeds more than half the length of the plasma, the usable preform length will decrease. This decrease in the usable preform length is attributable to the development of a geometric taper or the development of an optical taper caused by an overly strong change in the refractive index, or a combination thereof. The length of the plasma is fairly stable during deposition, though some lengthening of the plasma can occur as glass layers are deposited within the substrate tube's interior, thereby reducing the volume of the interior space within the substrate tube.

The term "geometric taper" refers to a taper in relation to the geometric properties of an optical preform. It has been found that, when the shift of the position of the reversal point near the supply side is greater than maximally half the length of the plasma, the usable preform length is smaller than if the position of the reversal point near the supply side is stationary during the entire deposition process.

If desired, the preform obtained according to the present invention may be externally provided with one or more additional glass layers (e.g., by placing the preform in a quartz glass tube or by applying silica via an external deposition process, or by a combination of the two). The preform, which may or may not be externally provided with one or more additional glass layers, may be heated at one end, after which an optical fiber can be drawn therefrom.

The foregoing, as well as other characteristics and advantages of the invention and the manner in which the same are accomplished, is further specified within the following detailed description and its accompanying drawings.

DETAILED DESCRIPTION

Figure 1:
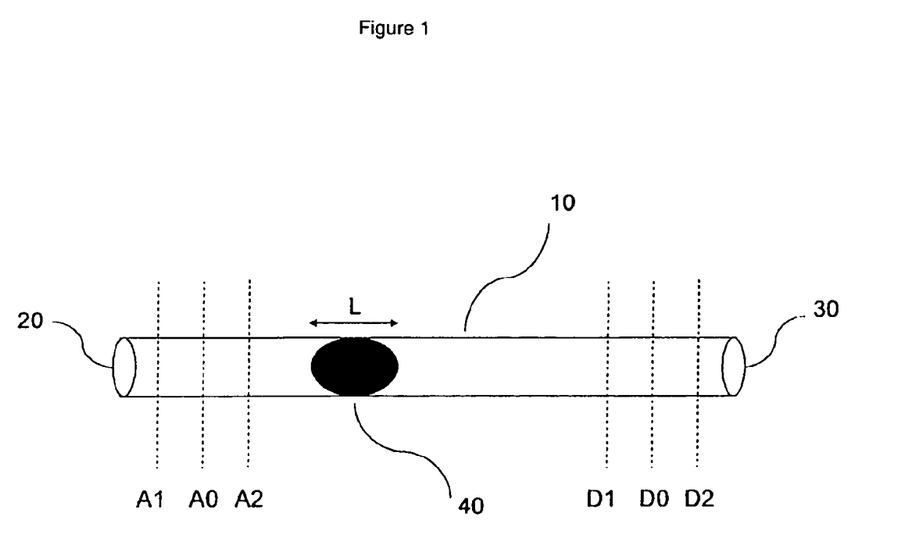
FIG. 1 schematically depicts a substrate tube in which the present invention is implemented.

FIG. 1 schematically depicts a hollow substrate tube 10 in which the internal vapor deposition process according to the present invention can be carried out. In the substrate tube 10, which has a supply side 20 and a discharge side 30, a plasma 40 having a length L is moved back and forth between two reversal points (A0, A1, A2 and D0, D1, D2, respectively). The length L is to be regarded as the length along which the plasma 40 extends along the longitudinal axis of the substrate tube 10.

The position of the reversal point near the supply side 20 is indicated A0, A1, and A2, respectively. The position of the reversal point near the discharge side 30 is indicated D0, D1, and D2, respectively.

The plasma 40 is generated by a resonator (not shown) that surrounds the substrate tube 10. The resonator is connected to a microwave-generating generator (not shown), such as a klystron, and couples microwaves into the substrate tube 10 so as to generate plasma conditions in the interior of the substrate tube 10.

In one particular embodiment, the substrate tube 10 and the resonator are surrounded by a furnace (not shown). As will be known to those having ordinary skill in the art, such a furnace might operate, for example, at about 1100° C. to 1200° C.

Referring to FIG. 1, position A0 corresponds to the position of the reversal point near the supply side 20 at the beginning of the aforementioned step (iii). Likewise, position D0 corresponds to the position of the reversal point near the discharge side 30 at the beginning of step (iii).

The position of the reversal point A0 near the supply side 20 shifts along the substrate tube's longitudinal axis 10 during at least part of step (iii). The position of the reversal point A0 near the supply side 20 can shift toward A1 (i.e., away from the discharge side 30) or toward A2 (i.e., in the direction of the discharge side 30).

In a one embodiment, the position of the reversal point A0 near the supply side 20 shifts in the direction away from the discharge side 30 of the substrate tube 10 (i.e., in the direction of A1). When the position of the reversal point A0 is shifted away from the discharge side 30 of the substrate tube 10 (i.e., in the direction of A1), the effect on the geometric taper is typically less than in the situation in which the position of the reversal point A0 near the supply side 20 is shifted in the direction of the discharge side 30 of the substrate tube 10 (i.e., in the direction of A2).

Alternatively, in another embodiment, the position of the reversal point A0 near the supply side 20 shifts in the direction toward the discharge side 30 of the substrate tube 10 (i.e., in the direction of A2). It has been observed, for example, that when the position of the reversal point A0 is shifted in the direction toward the discharge side 30 of the substrate tube 10 (i.e., in the direction of A2), the deposited glass layers near the supply side 20 of the substrate tube 10 possess reduced refractive index. In some instances, this can improve yield with respect to the fiber-forming length of the resulting optical preform.

As noted, the maximum longitudinal shift of the reversal point near the supply side 20 typically amounts to half the length L of the plasma 40 (i.e., L/2).

The deposition process may last for a few hours or so, but the time of travel (i.e., the cycle time) of the plasma 40 from the reversal point near the supply side to the reversal point near the discharge side and back to the reversal point near the supply side again is in the order of a few seconds (e.g., about 10 seconds). Consequently, a relatively large number of discrete positions will be taken up between position A0 and D0 and between A1 or A2 and D1 or D2, respectively.

The position of the reversal point may be shifted linearly as a function of time, for example. Typically, the shifting of the reversal point near the supply side takes place during the entire step (iii), particularly in view of the stress that is built into the deposited glass layers during this deposition step. For the same reason, the shifting of the reversal point near the discharge side usually takes place during the entire step (iii).

The shifting of the reversal point near the supply side 20 of the substrate tube 10 during at least part of step (iii) does not necessarily take place in only one direction. This means that a particular position of the reversal point near the supply side 20 can be taken up more than once during at least part of step (iii). It is possible, therefore, for the position of the reversal point near the supply side 20 at the beginning of step (iii) to be the same as the position of the reversal point near the supply side 20 at the end of step (iii), while viewed over the entire vapor deposition process (or step (iii)), a shift of the reversal point near the supply side 20 has indeed taken place, both in the direction of the discharge side and in the direction away from the discharge side, during at least part of step (iii).

Figure 2:
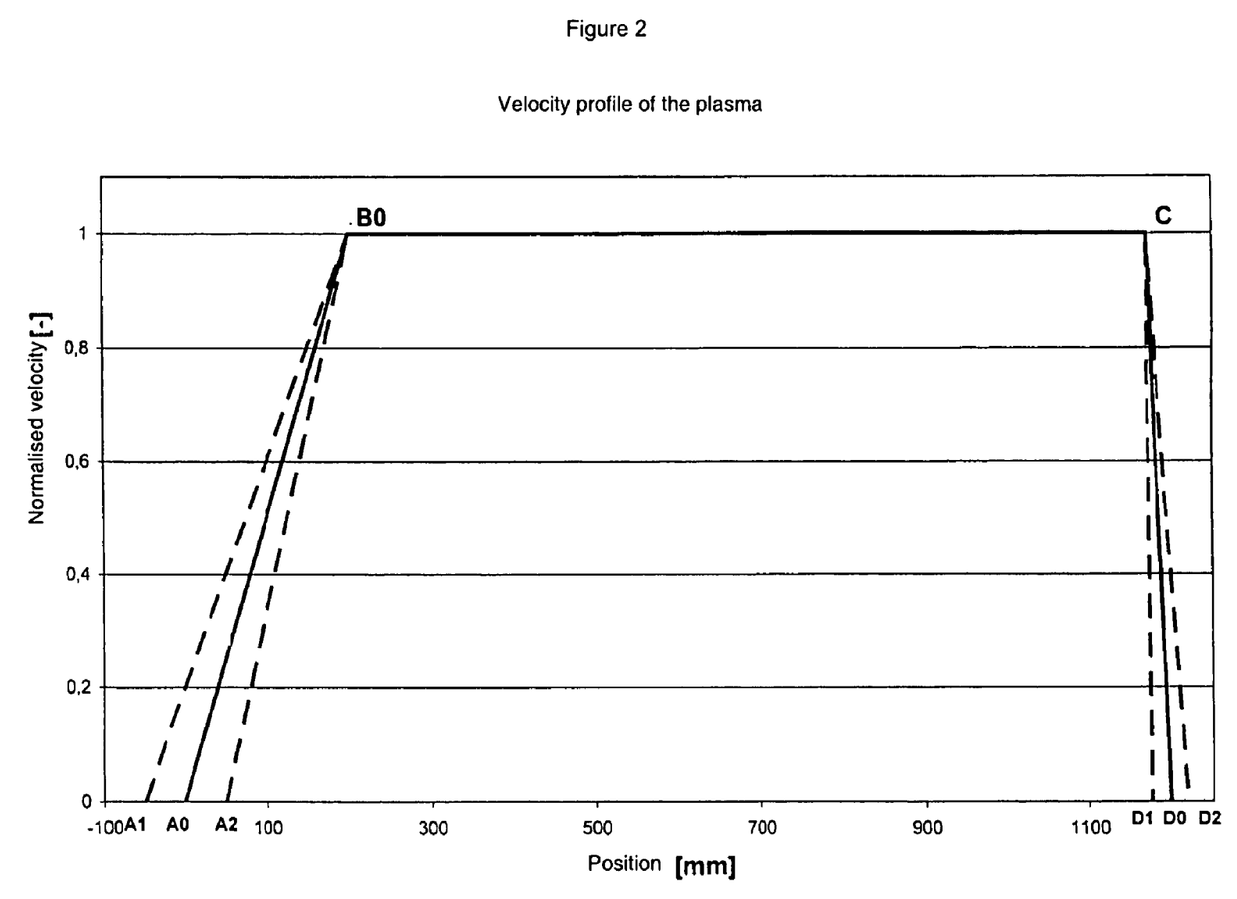
FIG. 2 depicts a velocity profile of the plasma according to the method of the present invention.

FIG. 2 shows the velocity profile of the plasma 40 during step (iii) of the present method. The position of the plasma 40 relative to the longitudinal axis of the substrate tube 10 is plotted on the horizontal axis. See FIG. 1. The normalized velocity at which the plasma 40 travels along the longitudinal axis of the substrate tube 10 is plotted on the vertical axis.

In this regard, the term "normalized velocity" refers to the velocity in relation to the velocity in the region B0-C shown in FIG. 2. For the sake of simplicity, FIG. 2 depicts this velocity as a constant velocity. It is within the scope of the present invention, however, to employ a variable velocity in the region B0-C.

When the plasma 40 travels from the reversal point near the supply side 20 (see FIG. 1) toward the reversal point near the discharge side 30 (see FIG. 1), the velocity of the plasma 40 increases to a normalized value equaling 1 in the region between positions A0 and B0 (or A1 and B0, or A2 and B0). Although this is not necessary, the plasma 40 then travels at a substantially constant velocity between positions B0 and C. The velocity of the plasma 40 decreases to a value of zero in the region between positions C and D0 (or C and D1, or C and D2). As the plasma 40 travels from the reversal point near the discharge side 30 toward the reversal point near the supply side 20, a velocity increase takes place in the region between the positions D0 and C (or D1 and C, or D2 and C), and a velocity decrease takes place in the region between the positions B0 and A0 (or B0 and A1, or B0 and A2). According to FIG. 2 and as noted, the plasma 40 is depicted to travel at a constant velocity in the region B0-C.

Figure 3:
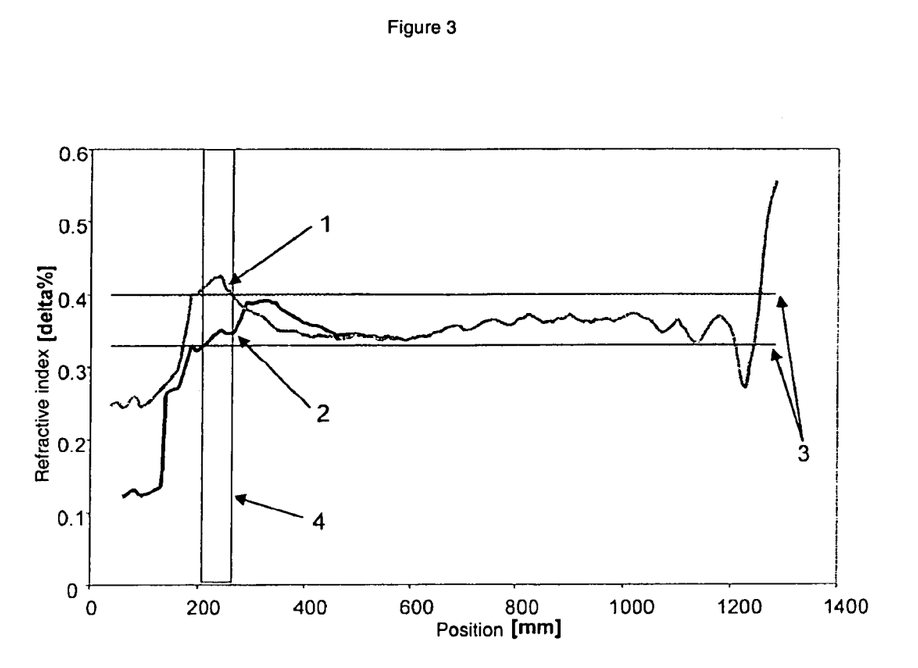
FIG. 3 depicts longitudinal refractive index profiles for two optical preforms.

FIG. 3 depicts longitudinal refractive index profiles for both a consolidated preform manufactured via a standard process (1) and a consolidated preform manufactured according to the present invention (2). Plotted on the horizontal axis is the longitudinal position with respect to the preform (i.e., preform length). Both preforms have a length of about 1,200 millimeters. Position 0 mm corresponds to the supply side 20 and position 1400 mm corresponds to the discharge side 30 of the substrate tube 10. Here, curve (2) is shown only for about the first 500 millimeters or so of the consolidated preform made according to the present invention.

Tolerance limits (3) indicate the minimum and maximum values of the refractive index as determined by the inventors. For a refractive index value outside these tolerance limits, the optical fiber that is made from the preform will exhibit optical defects. In FIG. 3, the exemplary tolerance limits are 0.33 and 0.4 delta %, respectively. The exemplary values, however, should not be interpreted as being limitative.

The value delta % is calculated according to the following formula:

$$\text{delta\_i \%} \equiv \frac{n_i^2 - n_c^2}{2n_i^2}$$

Figure 4:
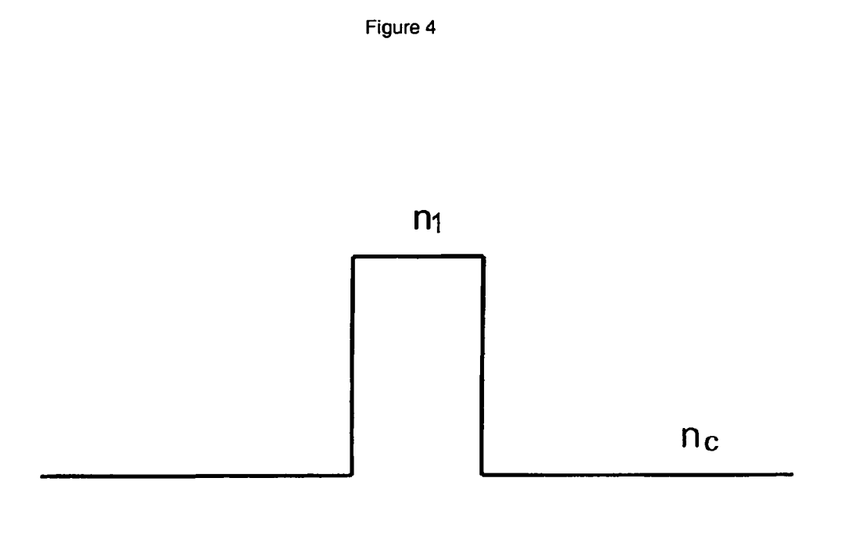
FIG. 4 depicts the radial refractive index profile of a simple step-index optical fiber.

In this formula, $n_i$ is the refractive index value at a radial position i in the consolidated preform, and $n_c$ is the refractive index value at a radial reference position c in the consolidated preform. The value $n_c$, for example, equals the refractive index value of the layer that surrounds the core. This layer is sometimes referred to as an "outer cladding" or an "optical cladding." Based on a radial refractive index profile for optical fibers as shown in FIG. 4, for example, delta__1% can be calculated by using the value of $n_1$ for $n_i$.

Referring again to FIG. 3, the longitudinal refractive index profile (1) shows a maximum value for the refractive index in the region indicated at (4) around position 200 mm. This localized maximum falls outside the aforementioned tolerance limits (3). Consequently, this part of the preform (1) is unsuitable for forming an optical fiber.

The longitudinal refractive index profile (2) also shows a maximum value for the refractive index near the supply side, but this localized maximum value falls within the tolerance limits (3). As a result, the usable preform length for a preform having refractive index profile (2) increases by about 50 millimeters in comparison with the usable preform length of the preform manufactured according to the prior art, such as a preform having refractive index profile (1). This 50-millimeter increase corresponds to an increase of about five percent in the preform length or, expressed in fiber length, an increase of 30 kilometers or more for a simple, single-mode optical fiber. See FIG. 4.

In addition to the this improvement with respect to the usable preform length, less stress is built into the glass deposited in step (iii) in preform (2) than in preform (1). As noted, this has been favorably observed to reduce the incidence of layer cracking.

Figure 5:
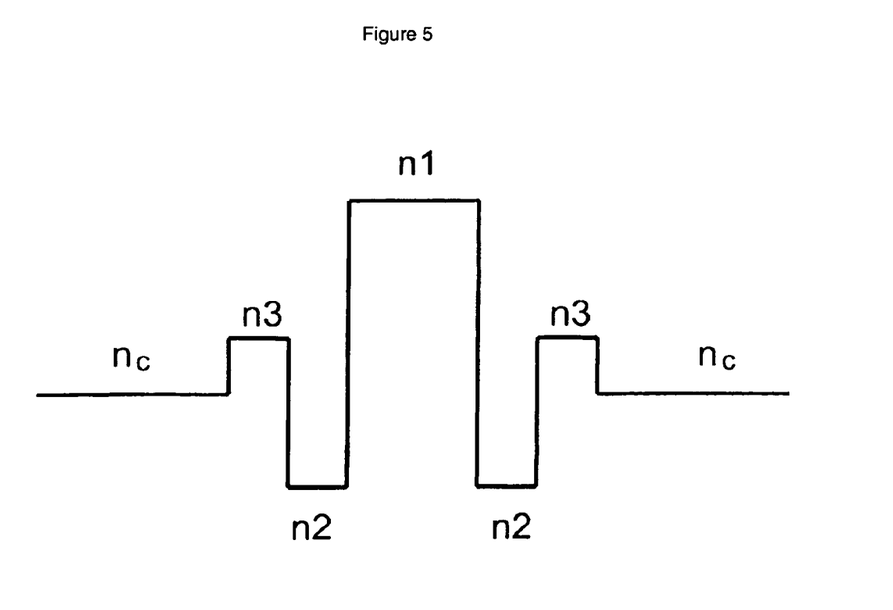
FIG. 5 depicts the radial refractive index profile of a W-type step-index optical fiber.

The method according to the present invention is particularly suitable for manufacturing preforms for optical fibers of the so-called step-index type. This term is used for fibers having a radial refractive index profile in which at least one preform layer (or core layer) of deposited glass layers is present. In this context, the concept of a "preform layer" (or a "core layer") is to be regarded as a number of glass layers having a constant refractive index value in the radial direction. Examples of such refractive index profiles are shown in FIGS. 4 and 5.

As noted, the present method can achieve optical preforms possessing improved longitudinal refractive index profiles. See FIG. 3. By way of example, an optical preform made according to the present invention will typically possess at least one core layer having a substantially constant refractive index value along most of the region between the reversal point(s) near the substrate tube's supply side and the reversal point(s) near the substrate tube's supply side (i.e., along most of the substrate tube's length where deposition occurs). With respect to an exemplary optical preform according to the present invention, each core layer will typically exhibit a substantially constant refractive index value for most of the substrate tube's length between the reversal point(s) near the substrate tube's supply side and the reversal point(s) near the substrate tube's supply side.

FIG. 4 depicts a simple step-index profile that includes a core having refractive index $n_1$ and a cladding having refractive index $n_c$. FIG. 5 depicts a W-type profile having a core that includes preform layers (i.e., core layers) having refractive indices $n_1$, $n_2$, and $n_3$ and a cladding having refractive index $n_c$. In producing a W-type profile such as that depicted in FIG. 5, for example, a different reversal point shift can be employed for each core layer (i.e., both with respect to the reversal points initial starting position and subsequent movement).

In an embodiment that includes more than one core layer having a constant refractive index in radial direction (e.g., as in the aforementioned W-type profile), it is possible to determine the optimum shift of the position of reversal points for each core layer during the deposition in step (iii) of the present method. Such adjustments to the positioning of reversal points can be achieved by those having ordinary skill in the art without undue experimentation. In other words, the initial position and subsequent shift of the reversal point at the substrate tube's supply side may be adjusted for the deposition of each core layer (e.g., to achieve refractive indices $n_1$, $n_2$ and $n_3$ as depicted in FIG. 5).

The present method can thus be regarded as a number of sub-steps within step (iii), wherein each sub-step embraces the deposition of a core layer. In particular, three core layers can thus be distinguished in FIG. 5, such as the core layers having refractive indices $n_1$, $n_2$ and $n_3$, wherein each core layer is formed in a sub-step and wherein the optimum shift of the position of the reversal points must be determined for each core layer in order to obtain a constant refractive index value along the length of the preform for the particular core layer.

EXAMPLES

Preforms for forming optical fibers having a radial refractive index profile as shown in FIG. 4 are manufactured via the method according to the present invention. The reversal point near the supply side shifts in the direction away from the discharge side during the entire step (iii). In FIGS. 1 and 2, this means that the reversal point near the supply side shifts from A0 to A1 during step (iii). The plasma length L is about 200 millimeters, and the shift takes place linearly with time. The total shift is varied, and the effect thereof on the usable preform length is determined.

TABLE 1

| example | total shift (mm) | usable preform length (mm) |
|---------|------------------|----------------------------|
| No shift | 0 | 1000 |
| I | 20 | 1010 |
| II | 50 | 1030 |
| III | 70 | 1050 |
| IV | 100 | 1050 |
| V | 110 | 980 |

It has been observed that preforms manufactured according to the present invention exhibit a reduction of about five percent with respect to layer cracking. By way of example, such a five percent reduction might represent an improvement in the incidence of layer cracking from seven percent of manufactured preforms to two percent of manufactured preforms.

This application incorporates entirely by reference the following commonly assigned U.S. patent documents, each of which pertains to optical preforms: U.S. Patent Application Publication No. US 2002/0097774 A1 and its related U.S. patent application Ser. No. 09/986,903 for a Device and Method for Manufacturing a Preform, filed Nov. 13, 2001, now U.S. Pat. No. 6,600,769; U.S. Patent Application Publication No. 2003/0164007 A1 and its related U.S. patent application Ser. No. 10/328,005 for a Method for Collapsing a Hollow Substrate Tube into a Rod-Like Preform While Heating, filed Dec. 26, 2002; U.S. Patent Application Publication No. 2004/0163417 A1 and its related U.S. patent application Ser. No. 10/725,426 for a Method of Manufacturing an Optical Fibre, filed Dec. 3, 2003; U.S. Patent Application Publication No. 2004/0237593 A1 and its related U.S. patent application Ser. No. 10/489,434 for a Method for Depositing One or More Glass Layers on the External Surface of a Glass Preform, filed Mar. 11, 2004; U.S. Patent Application Publication No. US 2005/0120751 A1 and its related U.S. patent application Ser. No. 10/959,331 for a Method for Manufacturing a Preform for Optical Fibres, as well as a Method for Manufacturing Optical Fibres, filed Oct. 7, 2004; U.S. Patent Application Publication No. US 2007/0003197 A1 and its related U.S. patent application Ser. No. 10/509,684 for a Method and Device for Manufacturing Optical Preforms, as well as the Optical Fibres Obtained Therewith, filed Jul. 21, 2006; U.S. Patent Application Publication No. US 2008/0031582 A1 and its related U.S. patent application Ser. No. 11/627,483 for a Method for Manufacturing an Optical Fiber Preform, filed Jan. 26, 2007; U.S. Patent Application Publication No. US 2007/0289532 A1 and its related U.S. patent application Ser. No. 11/762,959 for an Apparatus for Effecting Plasma Chemical Vapor Deposition (PCVD), filed Jun. 14, 2007; U.S. Patent Application Publication No. US 2008/0044150 A1 and its related U.S. patent application Ser. No. 11/775,542 for a Method for Making an Optical Fiber Preform via Internal Vapor Deposition, filed Jul. 10, 2007; U.S. Patent Application Publication No. US 2008/0063812 A1 and its related U.S. patent application Ser. No. 11/851,595 for a Method for Manufacturing an Optical Preform, filed Sep. 7, 2007; U.S. patent application Ser. No. 11/939,931 for an Apparatus and Method for Performing a PCVD Process, filed Nov. 14, 2007; and U.S. patent application Ser. No. 12/107,217 for an Apparatus and Method for Manufacturing an Optical Preform, filed Apr. 22, 2008.

In the specification and figures, typical embodiments of the invention have been disclosed. The present invention is not limited to such exemplary embodiments. Unless otherwise noted, specific terms have been used in a generic and descriptive sense and not for purposes of limitation.

The invention claimed is:

1. A method for manufacturing an optical preform for optical fibers via a vapor deposition process, comprising:
    (i) providing a hollow glass substrate tube having a supply side and a discharge side;
    (ii) supplying doped or undoped glass-forming gases to the interior of the substrate tube via the substrate tube's supply side;
    (iii) creating a plasma in the substrate tube's interior to deposit glass layers on the substrate tube's inner surface by moving the plasma back and forth along the substrate tube's longitudinal axis between a reversal point near the substrate tube's supply side and a reversal point near the substrate tube's discharge side; and
    (iv) consolidating into an optical preform the tube obtained in step (iii);
    wherein the position of the reversal point near the substrate tube's supply side shifts along the substrate tube's longitudinal axis during at least part of step (iii).

2. A method according to claim 1, wherein the position of the reversal point near the substrate tube's supply side shifts away from the substrate tube's discharge side along the substrate tube's longitudinal axis.

3. A method according to claim 1, wherein the position of the reversal point near the substrate tube's supply side shifts toward the substrate tube's discharge side along the substrate tube's longitudinal axis.

4. A method according to claim 1, wherein the shift of the position of the reversal point near the substrate tube's supply side is less than half the length of the plasma.

5. A method according to claim 1, wherein the position of the reversal point near the substrate tube's discharge side shifts along the substrate tube's longitudinal axis during at least part of step (iii).

6. A method according to claim 5, wherein the position of the reversal point near the substrate tube's discharge side shifts toward the substrate tube's supply side along the substrate tube's longitudinal axis.

7. A method according to claim 5, wherein the position of the reversal point near the substrate tube's discharge side shifts away from the substrate tube's supply side along the substrate tube's longitudinal axis.

8. A method according to claim 5, wherein the shift of the position of the reversal point near the substrate tube's discharge side takes place during the entire step (iii).

9. A method according to claim 5, wherein the shift of the position of the reversal point near the substrate tube's discharge side is carried out linearly as a function of time during at least part of step (iii).

10. A method according to claim 1, wherein the shift of the position of the reversal point near the substrate tube's supply side takes place during the entire step (iii).

11. A method according to claim 1, wherein the shift of the position of the reversal point near the substrate tube's supply side is carried out linearly as a function of time during at least part of step (iii).

12. A method according to claim 1, wherein the position of the reversal point near the substrate tube's supply side shifts along the substrate tube's longitudinal axis in a way that achieves a first core layer having a substantially constant refractive index value along the length of the substrate tube, the first core layer itself comprising a plurality of deposited glass layers.

13. A method according to claim 12, wherein the position of the reversal point near the substrate tube's supply side shifts along the substrate tube's longitudinal axis in a way that achieves upon the first core layer a second core layer having a substantially constant refractive index value along the length of the substrate tube, the second core layer itself comprising a plurality of deposited glass layers.

14. A method according to claim 1, wherein the position of the reversal point near the supply side of the substrate tube shifts along the longitudinal axis of the substrate tube so as to obtain a refractive index value in the glass layers thus deposited on the interior of the substrate tube that is substantially constant in the longitudinal direction of the substrate tube, wherein the glass layers are to be regarded as a preform layer, wherein one or more additional preform layers, each comprising a plurality of glass layers, are deposited on the preform layer thus obtained, wherein the position of the reversal point near the supply side of the substrate tube is selected for the deposition of each preform layer so that the refractive index value across the preform layer in question is substantially constant in the longitudinal direction of the substrate tube.

15. A method according to claim 1, further comprising heating the optical preform at one end and drawing an optical fiber therefrom.

16. A method for making an optical preform, comprising:
    providing a glass substrate tube having a supply side and discharge side;
    supplying glass-forming precursors into the substrate tube's interior via the substrate tube's supply side; and
    concurrently reciprocating a plasma between a reversal point at the substrate tube's supply side and a reversal point at the substrate tube's discharge side to cause the deposition of glass layers onto the substrate tube's interior surface, wherein, during at least part of the deposition of glass layers, the reversal point at the substrate tube's supply side shifts along substrate tube's length.

17. A method according to claim 16, wherein, during at least part of the deposition of glass layers, the reversal point at the substrate tube's supply side shifts away from the substrate tube's discharge side.

18. A method according to claim 16, wherein, during at least part of the deposition of glass layers, the reversal point at the substrate tube's supply side shifts toward the substrate tube's discharge side.

19. A method according to claim 16, wherein the reversal point at the substrate tube's supply side shifts along substrate tube's length throughout most of the period in which glass layers are deposited onto the substrate tube's interior surface.

20. A method according to claim 16, wherein, during at least part of the deposition of glass layers, the reversal point at the substrate tube's supply side shifts along substrate tube's length as a linear function of time.

21. A method according to claim 16, wherein, during at least part of the deposition of glass layers, the reversal point at the substrate tube's discharge side shifts along substrate tube's length.

22. A method according to claim 16, wherein, the plasma reciprocation between a reversal point at the substrate tube's supply side and a reversal point at the substrate tube's discharge side achieves one or more preform layers, each preform layer comprising a plurality of deposited glass layers having a substantially constant refractive index along most of the substrate tube's length.

23. A method according to claim 16, further comprising, after depositing glass layers on the substrate tube's interior, collapsing the substrate tube into a solid preform.

24. A method according to claim 23, further comprising heating the solid preform at one end and then drawing an optical fiber therefrom.

25. A method according to claim 16, wherein the shift of the position of the reversal point at the substrate tube's supply side is less than half the length of the plasma.

* * * * *